May 31, 1960  H. O. H. SCHWIND  2,938,362
MULTIPLE FLUID REFRIGERATING SYSTEM
Filed Sept. 2, 1955  3 Sheets-Sheet 1

INVENTOR
HERMANN O. H. SCHWIND
BY Sidney N. Rosenfeld
ATTORNEY

May 31, 1960 H. O. H. SCHWIND 2,938,362
MULTIPLE FLUID REFRIGERATING SYSTEM
Filed Sept. 2, 1955 3 Sheets-Sheet 2

INVENTOR
HERMANN O. H. SCHWIND

BY Sidney N. Rosenfeld
ATTORNEY

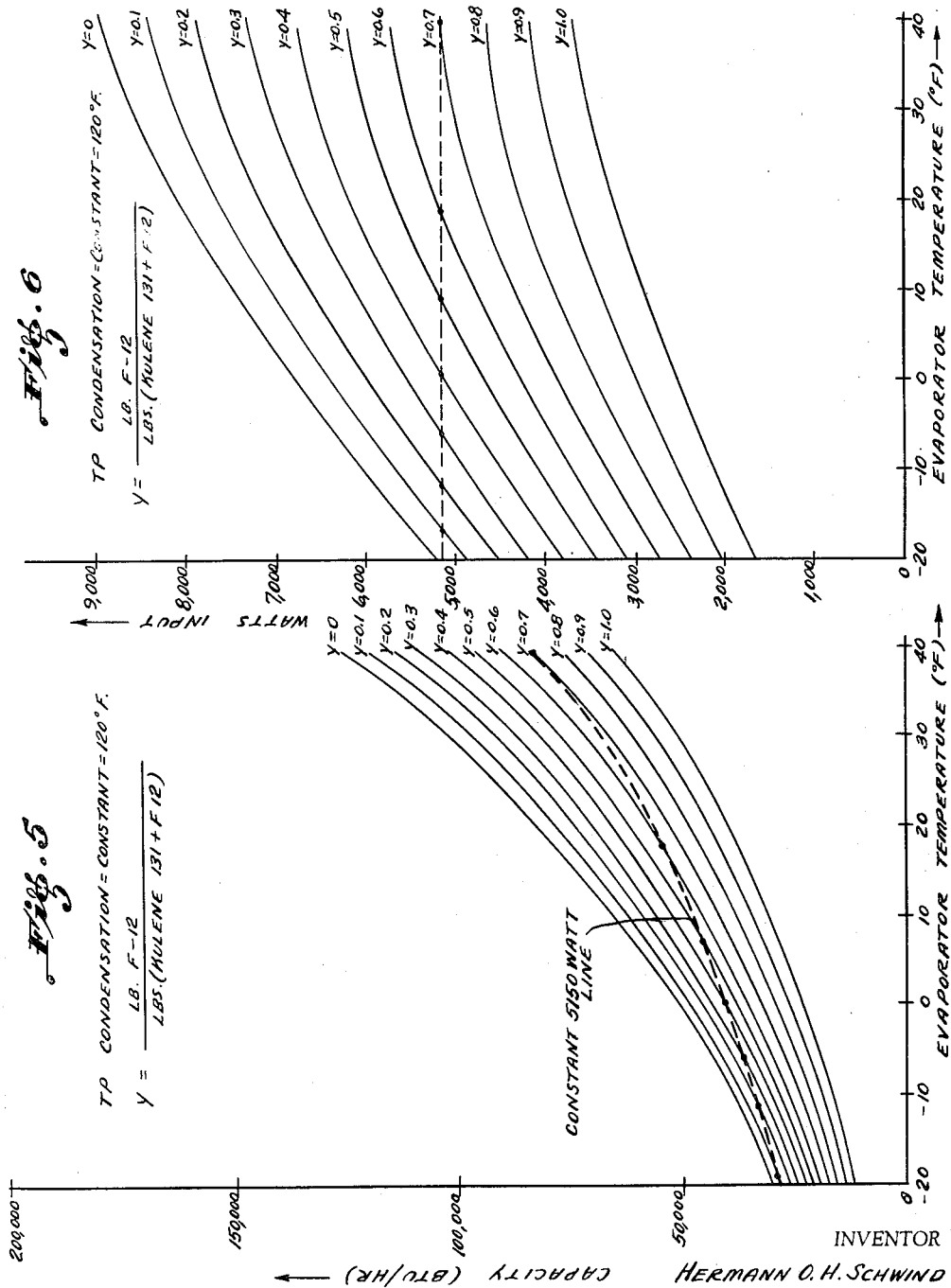

2,938,362
Patented May 31, 1960

2,938,362

MULTIPLE FLUID REFRIGERATING SYSTEM

Hermann O. H. Schwind, York, Pa., assignor, by mesne assignments, to Borg-Warner Corporation, Chicago, Ill., a corporation of Illinois Filed Sept. 2, 1955, Ser. No. 532,212

6 Claims. (Cl. 62—149)

This invention relates to refrigerating systems and, particularly, to a method of and apparatus for maintaining the capacity of such system at an optimum value irrespective of varying operating conditions. The invention also inherently provides a ready means of capacity control wherein an infinite range of capacity steps is possible between predetermined limits to meet a varying load condition for the purpose of maintaining a constant temperature in a product or product room.

It is well known to those skilled in the art that the capacity of a refrigerating plant decreases as the evaporator temperature drops. This is primarily due to the fact that the density of refrigerants decrease with a decrease in temperature. Utilizing a compressor of fixed volumetric displacement, such decrease in density results in a lesser weight of refrigerant being circulated with the resultant decrease in refrigerating capacity. Fig. 5 which, for this purpose, may be taken to be representative of all refrigerants, points up this aforesaid decrease in capacity in response to a lowering of evaporator temperature.

One concrete result of this decrease in capacity is the fact that where refrigerating plants are required to operate over a large temperature range, it is necessary to size the equipment to provide the needed capacity at the lowest evaporator temperatures, thereby having considerable excess capacity at higher evaporator temperatures.

This decrease in capacity due to a lowering of evaporator temperature also results in a marked limitation on the use of reverse cycle refrigerating systems, commonly known as heat pumps, where outside air is used as the heat source for winter heating. When a refrigerating plant is used for both summer cooling and winter heating, and outside air is used as the winter heating source, the capacity of the plant during the heating season rapidly falls off as the outside temperature drops, thereby greatly reducing the winter heating capacity.

Applicant's contribution results in a refrigerating system wherein the above limitations are completely obviated in many instances and substantially lessened in others. He provides a system including a compressor of the fixed volumetric displacement type, condenser, and evaporator having refrigerant flow lines therebetween, comprising the active refrigerating circuit. It is to be understood that means, such as an expansion valve or capillary tube, is provided between the condenser and evaporator to reduce the pressure of refrigerant flowing from the condenser to evaporator. The circuit utilizes a mixture of two refrigerants, one being a higher pressure refrigerant than the other. By a higher pressure refrigrant is meant one which exists at a higher pressure at a specific temperature. Implicit in the statement that applicant uses a mixture of refrigerants is the fact that the refrigerants selected must be miscible that is, they must be capable of forming a true solution. As the evaporator temperature drops, or whenever increased capacity is desired, the proportion of the higher pressure refrigerant in the mixture circulating in the active refrigerating circuit is automatically increased. The refrigerants selected must be such that the product, in B.t.u./ft.$^3$, of the available latent heat of vaporization of the mixture, in B.t.u./lb., times the density of the mixture vapor, in lbs./ft.$^3$, must increase as the proportion of the higher pressure refrigerant in the mixture increases, at any specified temperature. It will be evident that in a refrigerating plant utilizing a compressor of a fixed volumetric displacement, the amount of B.t.u.'s necessary to liberate one cubic foot of the refrigerant vapor at evaporator temperature is the main criterion for establishing the capacity of the plant. For convenience, in the specification and in the claims, the amount of B.t.u.'s necessary to liberate one cubic foot of the refrigerant mixture at any specified temperature shall be referred to as the total heat absorbing capacity of the mixture. This increase in the total heat absorbing capacity of the mixture in response to an increase in the percentage of the higher pressure refrigerant therein normally is due to a greater density of the higher pressure refrigerant, as compared with the other, which is more than sufficient to offset its generally lower latent heat of vaporization, resulting in increased capacity.

It will therefore be apparent that in applicant's system wherein the proportion of the higher pressure refrigerant in the active refrigerating circuit increases responsively to a lowering of evaporator temperature, such decrease in evaporator temperature will result in an increase in the total heat absorbing capacity of the circulated refrigerant mixture resulting in an increase in the capacity of the system, over the capacity available had the proportion of the higher pressure refrigerant in the mixture not been increased. Further, once the proportioning device has been activated, the system will at all times operate at a higher capacity than would be possible if the proportion of refrigerants in the mixture remained unchanged. As a necessary corollary of the above, applicant provides means for progressively restoring the mixture to its original proportions in response to an increase in the evaporator temperature.

As was pointed out, the invention also inherently provides a ready means of capacity control to meet changing load conditions on a refrigerating plant. In many instances it is desirable to have some control of capacity in case the capacity is excessive for a particular load on a particular day. Too much capacity overcools a product or room if the load happens to be light. Under such circumstances the capacity of the instant system may be varied as pointed out above, for the purpose however of maintaining constant temperatures. While devices are known for controlling the capacity of a refrigerating plant, these devices operate on large incremental steps, for example, reductions in increments of 25%. This invention operates to give an infinite number of capacity steps between the maximum and minimum limits of capacity.

A further limitation on the use of conventional refrigerating plants is that as the temperature range over which a conventional plant operates increases, a point is reached at which it is necessary to use compound compression systems. This is due to the fact that as the differentials in temperatures increase, the ratios of compression of the compressor increase, soon reaching a point beyond which the compressor cannot operate due to the generation of excessive heat. It will be found that in comparing temperature-pressure relations for the halogenated hydrocarbon compound refrigerants, for example, that have a given evaporator and condenser temperature, the compression ratio between discharge temperature and suction temperature is somewhat smaller for the high pressure as compared to the low pressure refrigerants. In the present system, a decrease in evaporator temperature is accompanied by an increase in the proportion of the higher pressure refrigerant in the mixture within the active refrigerating circuit. This results in a lower ratio of compression than would obtain were the mixture unchanging, allowing this system to be used over a wider temperature range before compound compression becomes necessary, since a lower compression ratio is of advantage in reducing the discharge temperature of the refrigerant. This advantage is not limited to the use of the halogenated hydrocarbon compound refrigerants, however, but would apply to any mixture that meets the criteria set out above and wherein the compression ratio for the higher pressure refrigerant is smaller for a given evaporator and condenser temperature.

It is believed that the many advantages of the instant invention will be readily apparent. Refrigerating plants will be able to operate efficiently and economically over a considerably greater temperature range. Heat pump applications of refrigerating plants using the invention will become practical in extremely cold climates since the lowering of the evaporator temperature will not have the extremely adverse effect on the capacity of the plant as against a conventional plant. The system inherently provides for capacity control in an infinite number of increments to maintain constant temperatures. Wider temperature differentials between evaporator and condenser are possible before it is necessary to use compound compression systems.

It is among the objects of this invention to provide a refrigerating system including an active refrigerating circuit utilizing a mixture of refrigerants in varying proportions for the purpose of maintaining the refrigerating capacity of the system at an optimum value.

A further object is to provide a refrigerating system including an active refrigerating circuit utilizing a mixture of refrigerants in varying proportions capable of capacity control in an infinite number of increments between maximum and minimum capacity.

It is a further object to provide a refrigerating system including an active refrigerating circuit charged with a mixture of a first refrigerant and a second lower pressure refrigerant wherein the proportion of the first refrigerant in the circuit increases with a decrease in evaporator temperature with a net increase in the total heat absorbing capacity of the mixture.

It is yet another object of this invention to provide a refrigerating system including an active refrigerating circuit charged with a mixture of a first refrigerant and a second lower pressure refrigerant wherein the proportion of the first refrigerant in the circuit is increased in response to an increase in the refrigerating load of the system, and wherein the original proportions of the mixture are progressively restored in response to a decrease in the load.

While the main purpose of the invention is to reverse or make less severe the capacity drop in a refrigerating plant due to a decrease in evaporator temperature, ancillary thereto is the concept of utilizing the additional capacity which becomes available upon a decrease in the condensing temperature. It is true that as the condensing temperature drops, the refrigerating capacity of a plant increases. Yet, an inspection of Fig. 4 will show that such reduction in condensing temperature at any constant evaporator temperature is also accompanied by a decrease in the electrical input to the motor which operates the compressor. Because of the direct relationship between capacity of a refrigerating plant and wattage input, it will become apparent that an additional capacity increase could be realized if the motor were operated always at its maximum permissible wattage input. In summation, if the wattage input to the motor were kept substantially constant at the maximum permissible point, the plant would operate at its maximum possible capacity. Further, Fig. 6 shows that there is a direct relationship between wattage input to the electrical motor and a decrease in evaporator temperature. Applicant therefore utilizes this fact in one form of control for his refrigerant proportioning device, making such device responsive to a lowering of the wattage input to the motor. He thereby measures the decrease in evaporator temperature by a decrease in wattage input and also measures the decrease in condensing temperature by such decrease in wattage input. It is therefore readily apparent that a decrease in the wattage input is used to reflect a decrease in the capacity of the system, whether such decrease be due to an actual lowering of capacity due to a decrease in evaporator temperatures, or a lowering in the possible capacity due to a decrease in condensing temperatures.

It is yet another object of the invention to provide a refrigerating system including an active refrigerating circuit utilizing a motor driven compressor and wherein a mixture of two refrigerants is circulated in said circuit; the proportion of the refrigerants in the mixture being varied in response to a change of the electrical input to the motor.

It is still another object to provide a refrigerating system including an active refrigerating circuit utilizing a motor driven compressor and wherein a mixture of a first refrigerant and a second lower pressure refrigerant is circulated in said circuit, the proportion of the first refrigerant in the circulating mixture being increased in response to a lowering of the electrical input to the motor with a consequent increase in the total heat absorbing capacity of the circulating mixture and an increase in the electrical input.

Another object is to provide a refrigerating system including an active refrigerating circuit having a motor driven compressor, said circuit utilizing a mixture of a first refrigerant and a second lower pressure refrigerant wherein the proportions of the refrigerant in the mixture are varied to maintain the electrical input to the motor substantially constant between predetermined limits.

In connection with the above, applicant provides means to progressively restore the mixture to its original proportions in response to an increase in the electrical input of the motor above a predetermined point.

The general nature of the invention having been set forth, a preferred embodiment will now be described with reference to the drawings, to disclose fully the features already mentioned as well as features of advantage which can be better appreciated after a detailed description.

Fig. 5 is a graph showing the variance in the capacity of a refrigerating plant in response to a lowering of evaporator temperature for two specific refrigerants and various constant proportions of the two; and superimposed thereon, a graph, in dashed lines, showing the effect of lowered evaporator temperatures on the capacity of a system embodying the instant invention of variable proportions of refrigerants; and Fig. 6 is a graph showing the variance in electrical input in response to lowering evaporator temperatures for the same refrigerants and combinations thereof as depicted in Fig. 5.

Referring first to Fig. 5, there is shown therein the effect of a drop in evaporator temperature on the capacity of a refrigerating plant. The lowermost line was plotted for a plant using (1) dichlorodifluoromethane, commonly known as "Freon–12," and the uppermost line for a system using bromotrifluoromethane, commonly known as "Kulene–131." The various lines between represent various mixtures of the two.

Fig. 5, and also Fig. 6, was constructed in the following manner: Mollier charts were calculated for the various mixtures and then were checked out at various points to insure their accuracy. A compressor with known volumetric efficiencies was chosen. The ratios of compression for a constant condensing temperature of 120° F. and the various evaporator temperatures shown in Figs. 5 and 6 were determined. Knowing the volumetric efficiencies and the ratios of compression, the actual compressor displacements at the various evaporator temperatures were then found. The curves were then calculated and constructed from the Mollier charts.

An inspection of Fig. 5 will reveal that as the proportion of "Kulene–131" in the mixture increases from pure "Freon–12" to pure "Kulene–131" at any specified evaporator temperature the capacity of the plant increases or, stated another way, the total heat absorbing capacity of the refrigerant mixture increases as the proportion of the higher pressure refrigerant (Kulene–131) in the mixture increases. Fig. 5 also clearly shows the sharp drop in capacity of a plant as the evaporator temperature drops, where the plant is using a single refrigerant or an unchanging mixture of two refrigerants.

Figure 4:
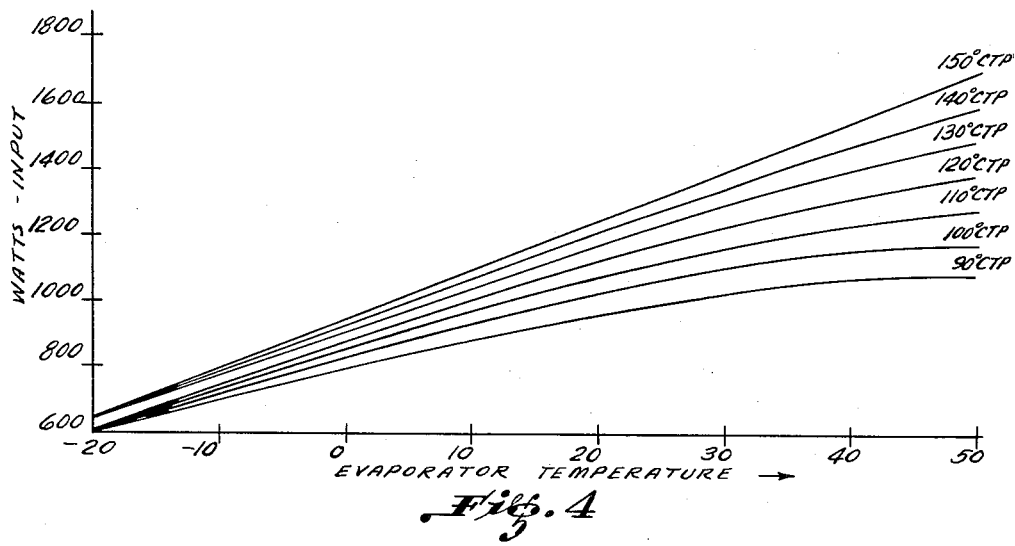
Fig. 4 is a graph showing the variance in electrical input to the motor of a motor controlled compressor in response to a lowering of evaporator temperature for various constant condensing temperatures, which graph is representative of all refrigerants.

Fig. 4 shows that at any constant evaporator temperature, a decrease in condensing temperature is accompanied by a corresponding decrease in the watt input. Fig. 6 points up the fact that at any specified temperature, the watt input to the system will increase or decrease as the total heat absorbing capacity of the mixture increases or decreases and also the watt input will drop as the evaporator temperature drops for a system using a single refrigerant or an unchanging mixture of two refrigerants. While Figs. 5 and 6 were constructed for "Freon–12" and "Kulene–131" and mixtures thereof, it should be realized that the graphs thereon are typical for any mixtures of miscible refrigerants, for example, the aforementioned halogenated hydrocarbon compound refrigerants, wherein the total heat absorbing capacity of the mixture increases as the proportion of the higher pressure refrigerant in the mixture increases. "Freon–12" and "Kulene–131" are therefore to be taken as representative of but one mixture of refrigerants which may be used to practice this invention. As was pointed out heretofore, the criteria for the refrigerants selected are that they be miscible and therefore capable of forming a true solution and that the product of the available latent heat of vaporization times the density of the vapor increase as the proportion of the higher pressure refrigerant in the mixture increases.

An interpretation of Figs. 5 and 6 reveals that for any refrigerants or mixtures thereof, the watt input may be used as a measure of the highest possible efficiency of the system under certain given conditions of operation. As was pointed out above, and as exemplified in Figs. 5 and 6, if a refrigerating system operates at a constant watt input equal to the maximum permissible input to the electric motor, the system will then be operating at its maximum possible capacity. Superimposed on Fig. 5 is a dashed line representing the capacity of a system embodying the present invention and operating at a constant watt input of 5150 watts.

This line was constructed from Figs. 5 and 6 as follows: It is evident from an inspection of Fig. 6 that in order to maintain a 5150 watt input as the evaporator temperature drops, the mixture must constantly be enriched in the higher pressure refrigerant. On Fig. 6, the point of intersection of the 5150 watt line and the various refrigerant lines was marked. It can be seen, for example, that the intersection of the 5150 watt line and the $y=0.7$ line occurs at an evaporator temperature of 40° F. On Fig. 5, the intersection of the $y=0.7$ line and the 40° line was located and this gives one point for the 5150 watt line. Similar procedures were followed for the other points of intersection on Fig. 6 and the points located on Fig. 5. A smooth curve was then drawn between the various points to give the 5150 watt line. It will be seen that on the 5150 watt line, the proportion of refrigerants which must be used varies from 70% "Freon–12"—30% "Kulene–131" to 10% "Freon–12"—90% "Kulene–131." As will be evident from Fig. 6, the 5150 watt line intersects the 90% "Kulene–131" line at an evaporator temperature of approximately —16.5° F. and as the evaporator temperature drops below that point, the mixture will be further enriched to pure "Kulene–131," and then the watt input will commence to drop following the pure "Kulene–131" line since the maximum point of increase of the total heat absorbing capacity of the refrigerant mixture has been reached.

An inspection of the 5150 watt line on Fig. 5 will reveal that the capacity of a refrigerating plant utilizing the principle of varying refrigerant mixtures will show a dropping off in capacity in response to a lowering of suction temperature but a considerably less severe drop than if the mixture were unchanging. In maintaining a constant watt input over the range of 40° F. to —11.5° F. evaporator temperatures, the capacity drops from 83,500 B.t.u. to 33,000 B.t.u. If the mixture were unchanging the capacity at —11.5° F. would have been 22,000. This represents an increase of 50% in the capacity at this point. The particular refrigerants used and the various proportions thereof will, of course, depend on the particular application. Also, as will be pointed out hereinafter, in a practical application the proportion of the mixture cannot vary from pure "Freon–12" to pure "Kulene–131" but instead must always contain some percentage of "Kulene–131," i.e., the mixture can vary from some predetermined mixture of the two refrigerants to the pure higher pressure refrigerant.

Figure 1:
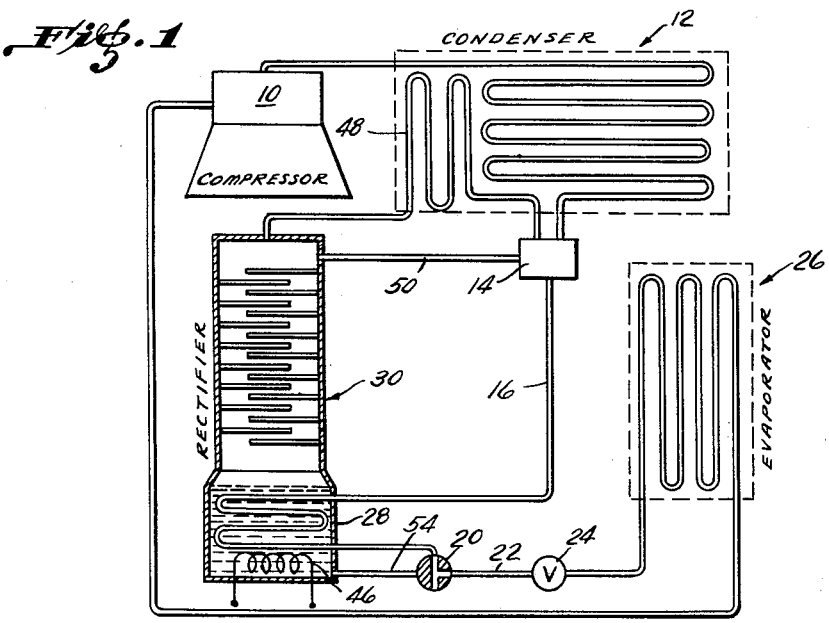
Fig. 1 is a schematic representation, in elevation, of a refrigerating system embodying the invention, with parts thereof in section to better illustrate details.

Referring now to Figure 1, a practical system will be described embodying the principles set out above. A compressor 10 delivers the refrigerant mixture in gaseous form to condenser 12 wherein the mixture is condensed to a liquid. From the condenser the liquid flows to overflow pot 14 and through line 16 to the three-way valve 20. From the three-way valve the liquid is directed through line 22 and expansion valve 24 to evaporator 26. In the evaporator the liquid picks up heat from the substance to be cooled thereby being evaporated; then the gas flows to the suction side of the compressor. As pointed out above, the compressor, condenser, expansion means, and evaporator and the flow lines therebetween comprise the active refrigerating circuit of the system.

For the purpose of being able to regulate the proportions of the refrigerants in the mixture, the system is charged with an excess amount of the refrigerant mixture with the excess being retained in the reservoir portion 28 of rectifier 30.

It is to be understood that the best mode contemplated by applicant for varying the mixture is by use of a rectifier. However, any method may be used to vary the mixture and still be within the ambit of the invention.

Figure 3:
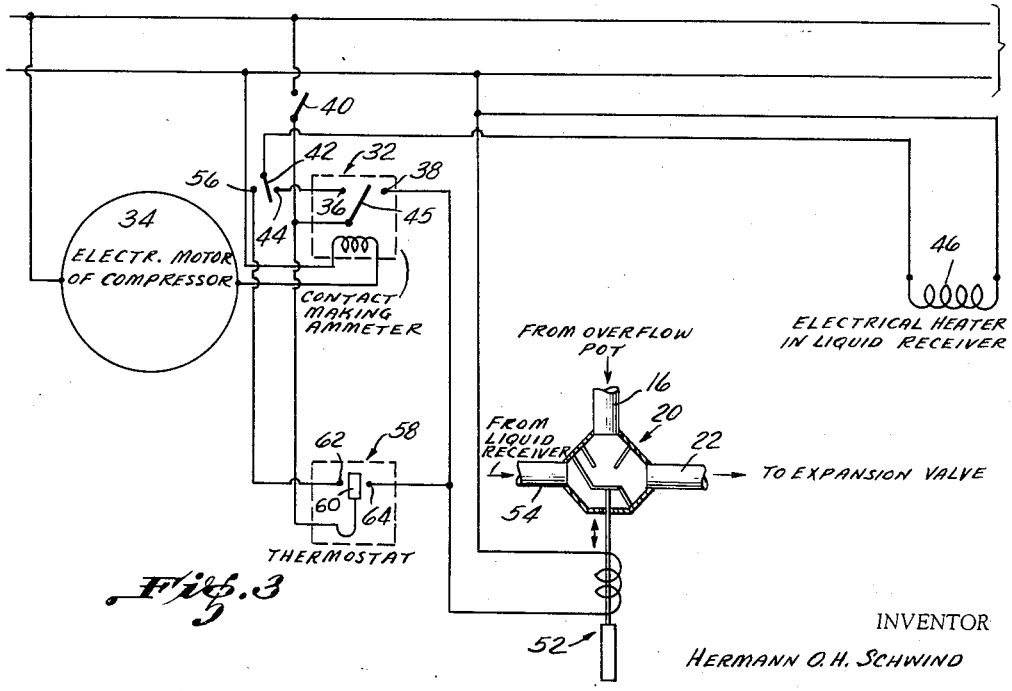
Fig. 3 represents a schematic showing of the electrical circuit used for controlling the refrigerant proportioning means of the Fig. 1 or Fig. 2 system.

An ammeter 32 is provided in the line to electric motor 34, as clearly shown in Fig. 3. However, any instrument suitable for measuring the electrical input of a motor may be utilized. The ammeter is provided with first and second contacts 36 and 38. Switch 40 will be closed and a switch 42 is placed in position to engage contact 44 completing an electrical circuit through ammeter 32 when a needle 45 thereof engages either contact 36 or 38. When ammeter needle 45 makes contact with contact 36 in response to a lowering of the electrical input to the motor, heater 46 is actuated to heat the refrigerant mixture in the reservoir. Upon such heating, refrigerant vapor will be driven from the rectifier and flow into the overflow pot after being condensed in coil 48 and will mix with the circulating refrigerant. The active circuit will then contain excess refrigerant and this excess will then flow via the overflow pot and line 50 into the top of the rectifier and the higher pressure refrigerant will thenceforth emerge from the top of the rectifier in a manner well understood by those skilled in the art. The higher pressure refrigerant is then condensed in coil 48 located in the condenser whence it flows to the overflow pot and becomes mixed with the circulating mixture. As the total amount of refrigerant in the active refrigerating circuit increases, the excess will flow from the overflow pot through line 50 to the rectifier, maintaining the total amount of refrigerant therein substantially constant. Therefore, it will be seen that the circulating mixture will become progressively enriched in the higher pressure refrigerant with a consequent increase in its total heat absorbing capacity.

Upon an increase in the electrical input to the motor, needle 45 will engage contact 38 to close the circuit to solenoid 52 actuating the three-way valve in such a manner as to open communication between lines 54 and 22, cutting off the communication between lines 16 and 22. Refrigerant in the reservoir will then progressively flow into the active circuit with the overflow being delivered through line 50 back to the rectifier. It will be readily apparent upon a continued mixing as set forth above that the circulating mixture and the reservoir retained mixture will become homogeneous corresponding to the original charge, with a consequent reduction in the electrical input.

Since many systems do not require operation at maximum capacity at all times, the system is provided with the dual-throw switch 42 which when rotated to engage contact 56 as seen in Fig. 3 will put thermostat 58 in the circuit taking the ammeter 32 out, thereby shifting control to the thermostat 58. Thermostat 58 is used to control the electrical heater and solenoid valve in the same fashion as the ammeter, but is however responsive to load conditions and will vary capacities in order to maintain a constant temperature whenever it is desired to do so within the maximum and minimum limits of capacity, the ammeter still operating as a motor load limit control, to insure that if the capacity were not satisfied at the maximum permissible motor load, the refrigerant mixture would not be enriched beyond that point. It is, of course, completely possible for hand controls to be used in response to changing load conditions.

The thermostat is placed wherever it is desired to control the temperature, i.e., in the evaporator, circulating brine, within the product or room to be cooled. Upon an increase in temperature, indicating an increased load, the circuit is closed to the heater 46 through needle 60 engaging contact 62 to thereby enrich the mixture in the higher pressure refrigerant and increase the capacity to thereby maintain the temperature constant. Upon a decrease in temperature indicating a decreased load, needle 60 engages contact 64 whereby the solenoid valve will be actuated to deliver the refrigerant in the reservoir through line 54 into the active circuit to progressively restore the mixture thereby lowering the capacity and again maintaining a constant temperature. It can also be seen that if the load on the motor reaches the maximum permissible point, the ammeter needle 45 will engage contact 38 closing the circuit to the solenoid to actuate the three-way valve in a position to progressively restore the mixture to its original proportions. When the mixture reaches a point where the electrical load has dropped, needle 45 will rotate in a counterclockwise direction breaking contact with contact 38 and allowing the thermostat to again control the system.

While it is theoretically possible for the circulating mixture to vary from "Freon-12" to pure "Kulene-131," practically speaking, as mentioned before, this is impossible of attainment. A practical example will serve to illustrate this point. For example, if a system is charged with a mixture of 50% "Freon-12" and 50% "Kulene-131," since the rectifier can only deliver "Kulene-131" (the higher pressure refrigerant), it can be easily seen that, while the charge in the active refrigerating circuit may be varied from 50% "Freon-12" to pure "Kulene-131," it cannot go below 50% "Freon-12" because it is not possible to separate the "Freon-12" in the reservoir from the mixture and deliver it to the active circuit to replace the "Kulene-131".

Another limitation to the possible variance of "Kulene-131" in the mixture is the size of the reservoir and the total amount of the mixture charged in the system. Again a practical example will illustrate this. For example, if a system wherein the active circuit requires a one pound charge is charged with one and one-half pounds of a mixture composed of 50% "Freon-12" and 50% "Kulene-131," it will be seen that even if all the "Kulene-131" is discharged from the rectifier into the active circuit, the one pound charge necessarily will be composed of 12 ounces "Kulene-131" (the total amount) plus four ounces "Freon-12," assuming a 100% rectifier efficiency.

Figure 2:
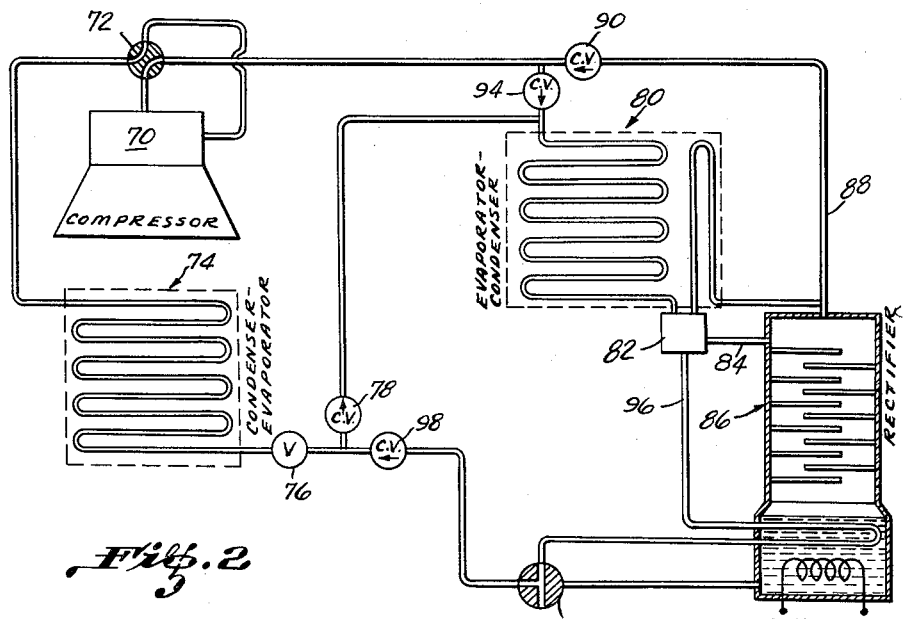
Fig. 2 is a view similar to Fig. 1, but showing an adaption of the invention to a refrigerating plant used for both heating and cooling.

Figure 2 represents an adaption of the invention to a refrigerating system used for both cooling and heating. For cooling, a compressor 70 delivers refrigerant via four-way valve 72 (which as shown is in its heating position and must therefore be rotated 90° in a clockwise direction) to a heat exchanger 74 functioning as a condenser. Condensed refrigerant flows via expansion valve 76 through check valve 78 to heat exchanger 80 operating as an evaporator. Leaving the heat exchanger, refrigerant vapor flows via overflow pot 82 and line 84 to the top of rectifier 86 whence it flows via line 88, check valve 90 and the four-way valve to the suction of the compressor. Three-way valve 92 is turned such that no liquid or gas can flow therethrough and switch 40 is open. It is thus evident that for cooling, the system functions as a normal refrigerating plant utilizing, however, a mixture of refrigerants.

When heating is desired, the four-way valve and three-way valve are turned to the position shown in Fig. 2. Switch 40, which is open during the cooling cycle, is closed. When the four-way valve is turned to reverse the system, switch 40 is manually closed or means may be provided to close the switch in response to the rotation of the four-way valve. Compressor 70 then delivers the refrigerant gas via check valve 94 to the heat exchanger 80 which on heating operates as a condenser. From heat exchanger 80 the condensed refrigerant then flows via overflow pot 82 through line 96 and thence through three-way valve 92 and check valve 98 to expansion valve 76 and thence to the heat exchanger 74, now functioning as an evaporator. The refrigerant vapor then flows via four-way valve 72 to the suction side of the compressor. Switch 42 is set to engage contact 44 or 46, as seen in Fig. 3, dependent on whether maximum capacity control or load control is desired. The operation of the refrigerant proportioning means is then identical to that disclosed and explained in the Fig. 1 system.

It is possible, of course, that in the operation of the Figure 2 system, when the system is reversed from cooling to heating the heater might be actuated for a certain period of time to enrich the circulating refrigerant mixture in the higher pressure refrigerant and thereafter be deactivated with the thus operating active refrigerating circuit on an unchanging mixture for the heating operation, which mixture, however, has a higher total heat absorbing capacity than the mixture used in the cooling cycle. I do not exclude this possibility.

Therefore, since many possible embodiments may be made of the mechanical features of the above invention, and as the art herein described might be varied in various parts, all without departing from the scope of the invention, it is to be understood that all matter hereinabove set forth or shown in the accompanying drawing showing a preferred form of the invention, is to be interpreted as illustrative only and not in any limiting sense.

What is claimed is:

1. A refrigerating system comprising an active refrigerating circuit, said circuit being charged with a mixture of two refrigerants, reservoir means communicating with the circuit and containing an excess supply of said mixture normally isolated from said circuit mixture, means for varying the respective proportions of the refrigerants in the circuit to vary the heat absorbing capacity thereof by varying the proportions in the reservoir, the total amount of mixture in said circuit remaining substantially constant, an electrically operated compressor, and means responsive to the electric input for controlling the varying means to proportion the refrigerants in the refrigerating circuit such that the electric input remains substantially constant between predetermined limits.

2. A refrigerating system including an active refrigerating circuit, said circuit being charged with a mixture of a first refrigerant and a second lower pressure refrigerant; means for increasing or decreasing the proportion of said first refrigerant in the circuit mixture, said means comprising a reservoir containing an excess amount of said mixture not normally circulating with the circuit mixture and including means to replace portions of said first or second refrigerants by like portions of the other refrigerant from said reservoir, said replaced portions being then retained in the reservoir; and means controlling said proportioning means to increase or decrease the proportion of the first refrigerant in the system respectively as the refrigerating load of the system is increased or decreased.

3. A closed refrigerating system including an active refrigerating circuit, said system being charged with a mixture of refrigerants, a predetermined portion of said mixture actively circulating in said circuit and the remainder of said mixture being isolated from said actively circulating portion, means establishing communication between the circulating and the isolated refrigerant, means operable at will to cause one of said refrigerants in the isolated portion to mix with the actively circulating refrigerant to thereby enrich the circulating mixture in said one refrigerant whereby the total heat absorbing capacity of the mixture is varied and means to maintain the total amount of circulating refrigerant substantially constant.

4. A refrigerating system including an active refrigerating circuit, said circuit being charged with a circulating mixture of a first refrigerant and a second lower pressure refrigerant miscible therewith; a reservoir containing an excess amount of said mixture isolated from said circulating mixture; means providing communication between said reservoir and said circuit; means responsive to an increase in the refrigerating load of said system to increase the proportion of the first refrigerant in the circulating mixture including a rectifier, the communication between said reservoir and said circuit being through said rectifier, and heating means in said reservoir; and means responsive to a decrease in said load to progressively restore the circulating refrigerants to the original proportions.

5. A refrigerating system for cooling and heating an enclosure including a motor driven compressor, a condenser, an expansion means, and an evaporator comprising an active refrigerating circuit, said system being charged with a mixture of a first refrigerant and a second lower pressure refrigerant, said mixture comprising a portion circulating in said refrigerating circuit and a retained excess portion isolated therefrom, means for retaining said excess, means for varying the proportions of the refrigerants in the circulating circuit mixture to vary the total heat absorbing capacity thereof by varying the proportions of the retained excess, the total amount circulated remaining substantially constant, flow directing means routing said circulating mixture from the compressor to the condenser through the expansion means and then to the evaporator, means for reversing the flow of said mixture when heating is desired whereby the functions of said condenser and evaporator are reversed, and means rendering said varying means effective upon said reversal, said varying means being responsive to the electrical input of the motor to increase the proportion of said first refrigerant in the circulating mixture upon a drop in the electrical input to the motor.

6. The system of claim 1 wherein said varying means is effective to maintain the electrical input to said motor substantially constant between predetermined limits.

References Cited in the file of this patent

UNITED STATES PATENTS

| | | |
|---|---|---|
| 2,255,584 | Hubacker | Sept. 9, 1941 |
| 2,277,138 | Newton | Mar. 24, 1942 |
| 2,367,306 | Newton | Jan. 16, 1945 |
| 2,451,385 | Groat | Oct. 12, 1948 |
| 2,483,842 | Philipp | Oct. 4, 1949 |
| 2,589,384 | Hopkins | Mar. 18, 1952 |
| 2,677,243 | Telkes | May 4, 1954 |
| 2,682,756 | Clark et al. | July 6, 1954 |
| 2,794,328 | Herrick | June 4, 1957 |

UNITED STATES PATENT OFFICE
CERTIFICATE OF CORRECTION

Patent No. 2,938,362            May 31, 1960

Hermann O. H. Schwind

It is hereby certified that error appears in the printed specification of the above numbered patent requiring correction and that the said Letters Patent should read as corrected below.

Column 10, line 33, for the claim reference numeral "1" read -- 5 --.

Signed and sealed this 1st day of November 1960.

(SEAL)
Attest:

KARL H. AXLINE
Attesting Officer

ROBERT C. WATSON
Commissioner of Patents